United States Patent
Kajjam et al.

(10) Patent No.: US 9,615,149 B1
(45) Date of Patent: Apr. 4, 2017

(54) PROCESS INTERFACE INCLUDING WIRELESS MULTI-LOOP SINGLE HOP DEVICE

(71) Applicant: Honeywell International Inc., Morris Plains, NJ (US)

(72) Inventors: Praveen Kumar Kajjam, Telangana (IN); Suresh Kumar Palle, Karnataka (IN); Jaganmohan Y. Reddy, Andhra Pradesh (IN); Sridhar Sankaranarayanan, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/922,650

(22) Filed: Oct. 26, 2015

(51) Int. Cl.
| | |
|---|---|
| G08C 19/22 | (2006.01) |
| H04Q 9/00 | (2006.01) |
| H04B 1/3827 | (2015.01) |
| H04W 4/00 | (2009.01) |
| H04W 84/04 | (2009.01) |

(52) U.S. Cl.
CPC ............ *H04Q 9/00* (2013.01); *H04B 1/3827* (2013.01); *H04W 4/008* (2013.01); *H04Q 2209/40* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 7,228,186 B2 | 6/2007 | Karschnia et al. | |
| 7,684,768 B1 | 3/2010 | Fest et al. | |
| 8,005,514 B2 | 8/2011 | Saito et al. | |
| 8,049,361 B2 | 11/2011 | Kielb et al. | |
| 2009/0146502 A1* | 6/2009 | Sinreich | G05B 19/0423 307/104 |
| 2010/0007208 A1* | 1/2010 | Huck | H04L 12/40045 307/31 |
| 2013/0082667 A1* | 4/2013 | Sinreich | H02J 1/10 323/234 |
| 2013/0344818 A1* | 12/2013 | McGuire | G01D 21/00 455/73 |
| 2014/0232207 A1* | 8/2014 | Lee | H04B 5/0031 307/151 |

* cited by examiner

*Primary Examiner* — George Bugg
*Assistant Examiner* — Renee Dorsey
(74) *Attorney, Agent, or Firm* — Jetter & Associates, P.A.

(57) ABSTRACT

A process interface device for a process facility running a physical process includes a multi-loop current junction box including an analog front end (AFE) having a signal path including an input node, an output node, and an internal current sensor for each current loop. Respective input nodes receive analog current sensing signals (sensing signals) originating from each field devices within the process facility. An analog to digital converter (ADC) has inputs coupled across an output of the internal current sensor device. A wireless single hop device (WSH device) includes a processor and a wireless transmitter, wherein an input of the WSH device is coupled by a communications bus to receive respective outputs generated by the ADC being digitized versions of sensed ones of the sensing signals (sensed sensing signals). The WSH device is for wirelessly multiplex transmitting the sensed sensing signals for remote monitoring of the current loops.

12 Claims, 9 Drawing Sheets

PROCESS INTERFACE INCLUDING WIRELESS MULTI-LOOP SINGLE HOP DEVICE

FIELD

Disclosed embodiments relate to process control in processing facilities such as industrial plants (e.g., gas processing stations, wellheads), where multiple process parameters are either monitored and/or controlled.

BACKGROUND

Field devices such as sensors and actuators are arranged within a plant, factory or other facility such a petrochemical plant, oil refining or pharmaceutical plant, where in the case of sensors they detect physical quantities, such as temperature, pressure and flow rate, and in the case of actuators transmit the control variable signals to controlling equipment such as pneumatic control valves or motor operated valves. Usually the field devices (e.g., sensors and actuators) are installed at a distant location to the control equipment. The control equipment is usually installed near to the central control room of the plants.

The sensor signals (or process variables) are transmitted as analog communication signals (such as 4 to 20 mA, 0 to 5V, 1 to 5V, etc.) over a pair of connected wires. The 4 mA to 20 mA current loop output is a standard interface for many industrial process control and factory automation systems. Similarly, the same method is used to send a control signal to process equipment such as control valves. The sensor and control valve along with a process controller forms a control (or current) loop. It is a general practice to install multiple devices (such as field displays, recorders etc.) in the same current loop in series. The analog wired communications from the field devices to the control room is passed through multiple junction boxes based on the wiring philosophy and location of the devices.

Although the process data is transmitted to the host system through an analog current signal, the current signal cannot be measured without breaking the current loop because a current measuring instrument (e.g., sensing resistor) needs to be connected in series with the loop to sense the current. However connecting a measuring device in series in the current loop forces the existing communications to be disconnected, albeit for a brief period of time. The general practice of repair to the wire continuity occurs at junction boxes. The junction boxes are typically prewired with terminal blocks and hence need to be opened to check the level of the current signal for the identified pair of wires.

Moreover, the process variable value is available only to the particular host system to which it is physically wired and connected. The process variable data can also be made available as a wireless signal using existing suitable adapters, which are limited in range (e.g., wireless HART and ISA100). However, it is expensive to create a wireless transmission capability at each process variable level without having dedicated wireless infrastructure in suitable locations and ranges. Conventional solutions in industrial control have many data hops to cross (level 0 to level 1 to level 2 to level 3 to level 4) for making the sensor data available on Internet (to allow connection to wireless devices) or to the level 4 network (e.g., operators in a control room).

SUMMARY

This Summary is provided to introduce a brief selection of disclosed concepts in a simplified form that are further described below in the Detailed Description including the drawings provided. This Summary is not intended to limit the claimed subject matter's scope.

Disclosed process interfaces are for a process facility running a physical process and include a multi-current loop junction box (junction box) comprising an analog front end (AFE) including a signal path having an input node and an output node, as well as an internal current sensor device for each loop. Respective input nodes receive analog current sensing signals (sensing signals) originate from each of a plurality of field devices within the process facility. An analog to digital converter (ADC) has inputs coupled across an output of the internal current sensor device. A wireless single hop device (WSH device) includes a processor and a wireless transmitter, wherein an input of the WSH device is coupled by a communications bus to receive respective outputs generated by the ADC being digitized versions of sensed ones of the sensing signals (sensed sensing signals). The WSH device is for wirelessly multiplex transmitting the sensed sensing signals to enable remote monitoring of the plurality of current loops. Disclosed process interface devices are thus interfaced with both the field devices (e.g., sensor) and the control system (e.g., a distributed control system (DCS)).

Disclosed process interface devices enable direct monitoring of process variables without conventional multiple single hop solutions (level 0 to level 1, level 1 to level 2, . . . ) for process monitors for industrial plants (e.g., gas processing stations, wellheads) or factories, where multiple process parameters are either monitored and/or controlled. Such process interfaces can be provided at Level 0 or level 1 within the process facility. Disclosed process interface devices enable diagnosis and troubleshoot mechanisms for the field engineer without breaking the current loops. Loop power can power the process interfaces including the WSH device.

DETAILED DESCRIPTION

Figure 1A:
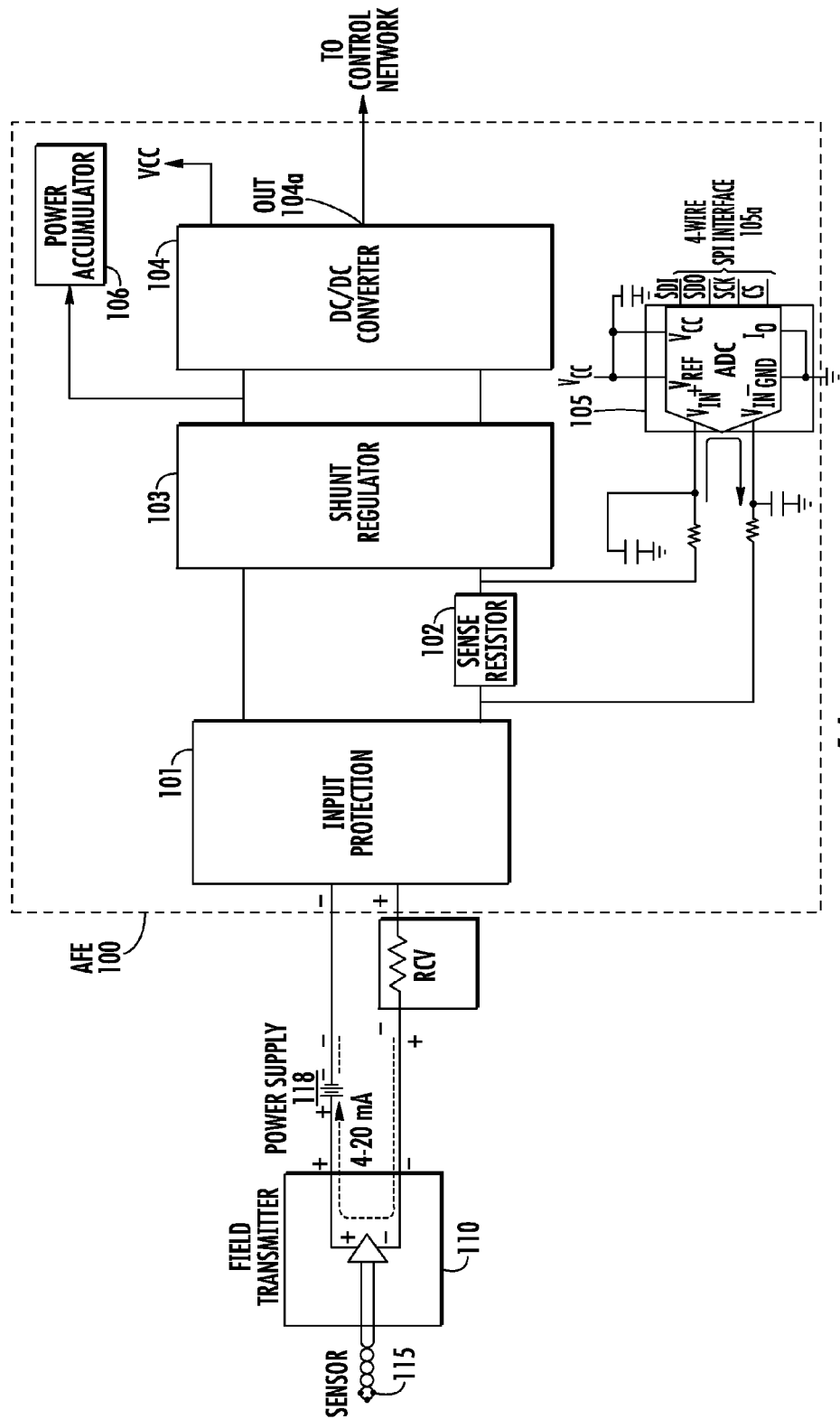
FIG. 1A depicts a block diagram for an example single channel AFE for a disclosed current loop junction box, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1A depicts a block diagram for an example single channel AFE 100 for a disclosed current loop junction box for current loop sensing, according to an example embodiment. AFE 100 includes an input protection block 101 receiving a 2 wire current input signal sent by a field transmitter 110 powered by a power supply 118 (shown as a DC power supply providing 4 mA to 20 mA current) which is coupled to the output of a field device shown as a sensor 115 (e.g., a level sensor). AFE 100 also includes regulators shown as a shunt voltage regulator 103 and a DC/DC converter 104. Shunt regulator 103 converts the current signal received into a voltage (e.g., 1.8V) and the DC-DC converter 104 boosts the level of this voltage (e.g., 1.8V) to a higher level (e.g., 3.0V) which is generally needed to power the rest of the electronics of the AFE 100. The output of the DC/DC converter 104a shown as OUT may be provided to a control network (level 1) so that conventional wired multi-hop transmissions up the respective process levels can occur in parallel to disclosed remote monitoring to allow communication with the host systems (such as to Input and Output (IO) Modules of control and display systems).

There is a precision sense resistor (sense resistor) 102 between input protection block 101 and shunt regulator 103 that provides the input to enable disclosed remote monitoring. Connected across the sense resistor 102 is an analog to digital converter (ADC) 105 which provides a 4-wire SPI interface 105a generally comprising an isolator that galvanically isolates the AFE 100 from the WSH device 200 described below (see FIG. 2), such as an opto-isolator that transmits information across the isolated interface using light waves. Galvanic isolation includes a coupling structure that has no direct electrical conduction path. The ADC 105 can be a 16-bit ADC that functions to digitize the loop current passing through the sense resistor 102 with a digital output. AFE 100 also includes a power accumulator 106 for accumulating power from the loop current, typically comprising a capacitor bank for storing power supplied to AFE 100 by the power supply 118 during idle intervals of time for power storage.

As known in the art, in SPI the master and slave are linked by three data wires, usually called MISO (Master in, Slave out), MOSI (Master out, Slave in) and M-CLK. The M_CLK line carries clock pulses which provide synchronization. When a transfer is taking place, a bit of data is transferred via MOSI from master to slave and at the same time a bit of data is transferred via MISO from slave to master. At the end of eight clock pulses an entire byte of data has been transferred in each direction.

Figure 1B:
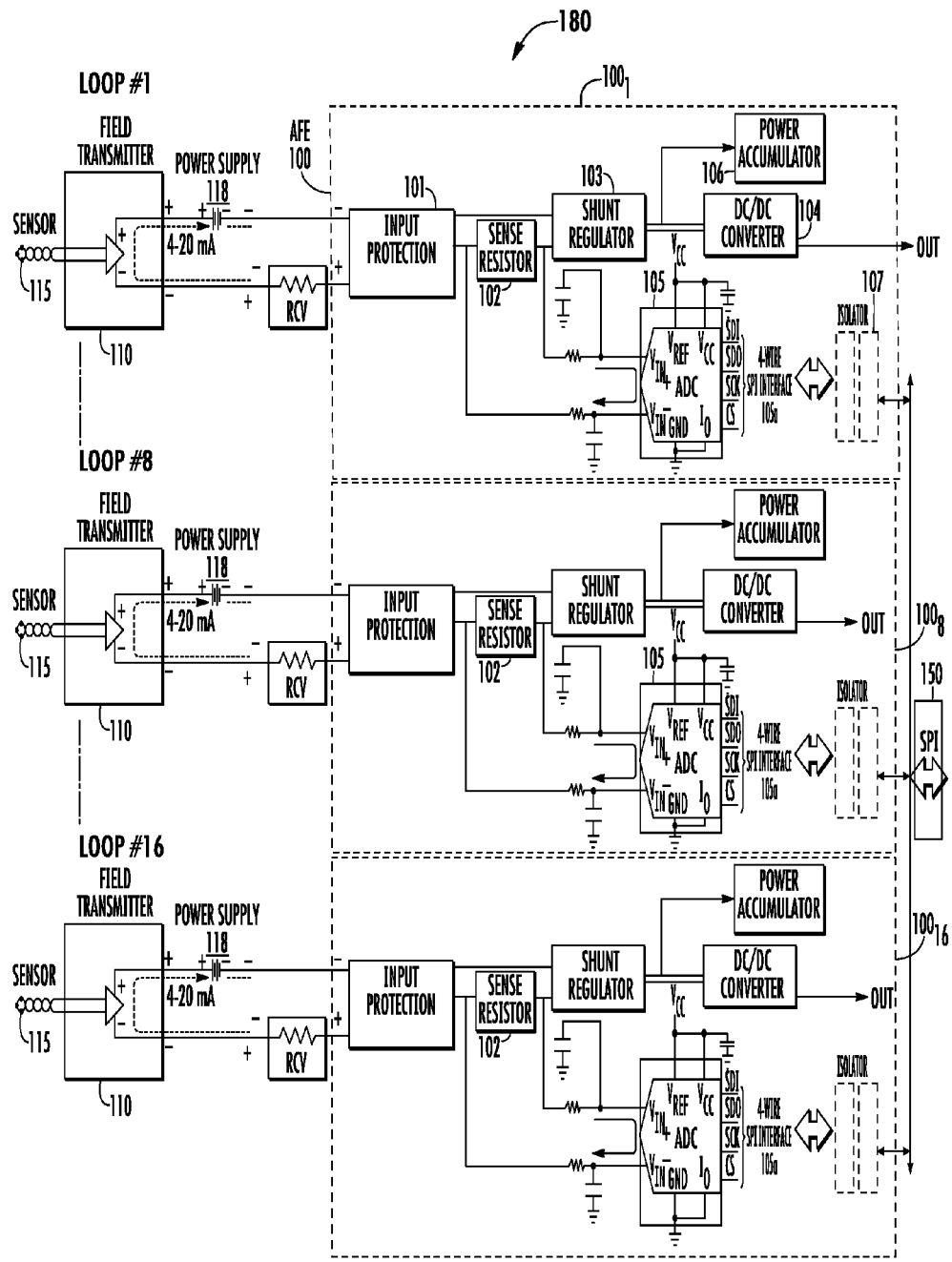
FIG. 1B depicts a disclosed loop junction box shown receiving circuit sensing signals from 16 current loops, including a separate AFE for each loop, with the output of the respective AFE's coupled to a serial bus shown as a Serial Peripheral Interface (SPI) bus, according to an example embodiment.

FIG. 1B depicts a disclosed multi-current loop junction box (junction box) 180 shown receiving sensing signals from 16 current loops, loops 1 to 16, including a separate AFE shown as AFE $100_1$, $100_8$, $100_{16}$, for each loop, according to an example embodiment. The output of the respective AFE's are all coupled by an isolator 107 to a communications bus 150 shown as a SPI bus. The SPI bus can be replaced by another bus, such as an I2C (Inter-Integrated Circuit) bus which is another known serial bus specification.

Figure 2:
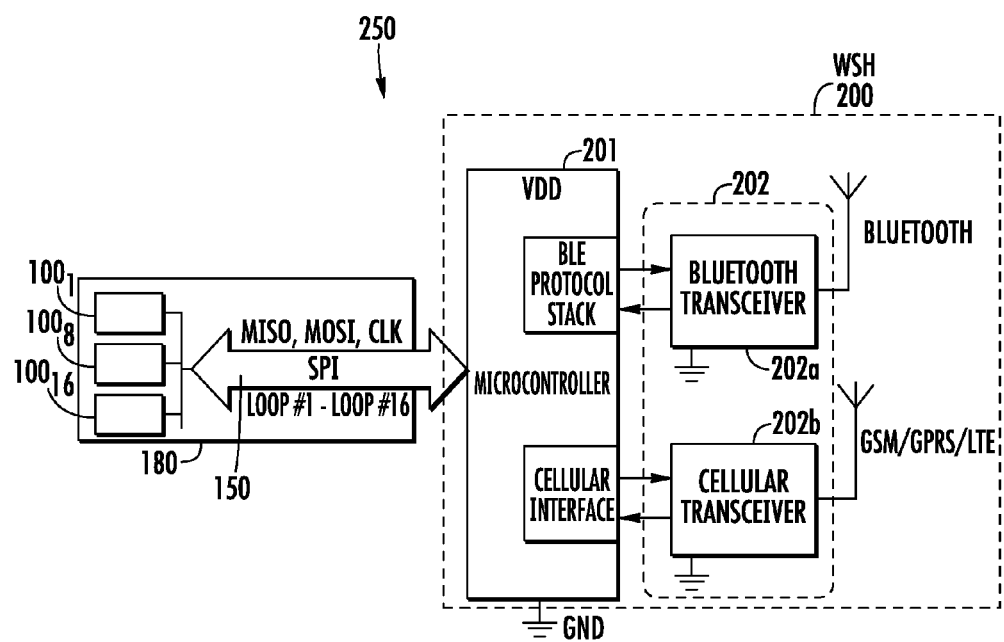
FIG. 2 depicts a block diagram of an example process interface device for remote monitoring of a plurality of current loops including a WSH device shown receiving sensing signals for current loops 1 to 16 transmitted from AFE 1 to 16 over an SPI bus, according to an example embodiment.

FIG. 2 depicts a block diagram of an example process interface device 250 including a digital wireless interface for remote monitoring of a plurality of current loops including a WSH device 200 shown receiving sensed sensing signals comprising respective outputs generated by the ADC 105 being digitized versions of sensed ones of the sensing signals input to the AFEs 100, according to an example embodiment. The WSH device 200 is installed at the same level (level 0, level 1 or level 2) as the junction box 180 including the AFEs $100_1$ to $100_{16}$ The WSH device 200 can comprise an industrial modem and can optionally be designed for installation in the zones certified as hazardous by including an intrinsic safe design.

Using multiplexing techniques, process data across multiple current loops can be transmitted simultaneously by WSH device 200. Thus, sensed sensing signals for current loops 1 to 16 are transmitted from the AFE's $100_1$ to $100_{16}$ communications bus 150 to WSH device 200 including a processor 201 shown as a microprocessor in FIG. 2 and a wireless transmitter 202 shown as a BLUETOOTH transceiver 202a and a cellular transceiver 202b, although only one wireless transmitter is generally needed. The transmitter and the receiver provided by transceivers 202a, 202b may be implemented as separate blocks. Accordingly, a "transceiver" as used herein includes both of these arrangements.

Process interface device 250 thus uses BLUETOOTH low energy (BLE) or a cellular network (e.g., CDMA, TDMA or GSM) to receive and transmit multiple loops data in a process control system. For BLE, the WSH device 200 has a BLUETOOTH interface with the measuring instruments.

For a cellular interface, time division multiplexing (TDM) data processing techniques can be used to multiplex transmit data's over cellular networks.

Figure 3A:
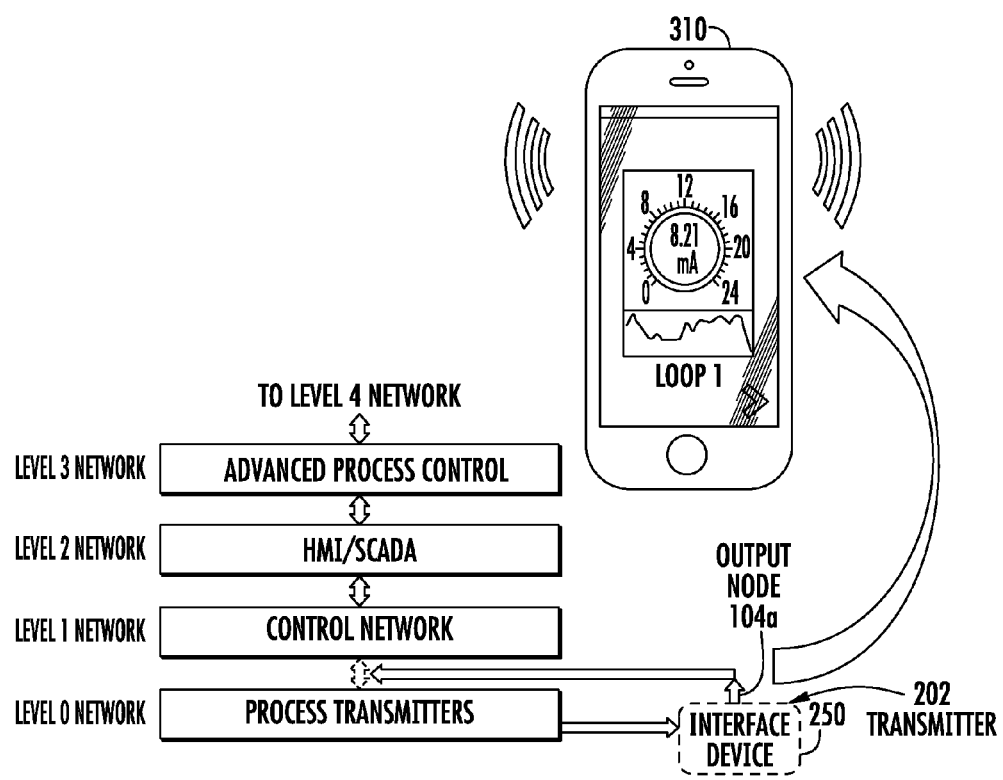
FIG. 3A shows a disclosed process interface device for remote monitoring of a plurality of current loops positioned between Level 0 and Level 1 in a process facility.
Figure 3B:
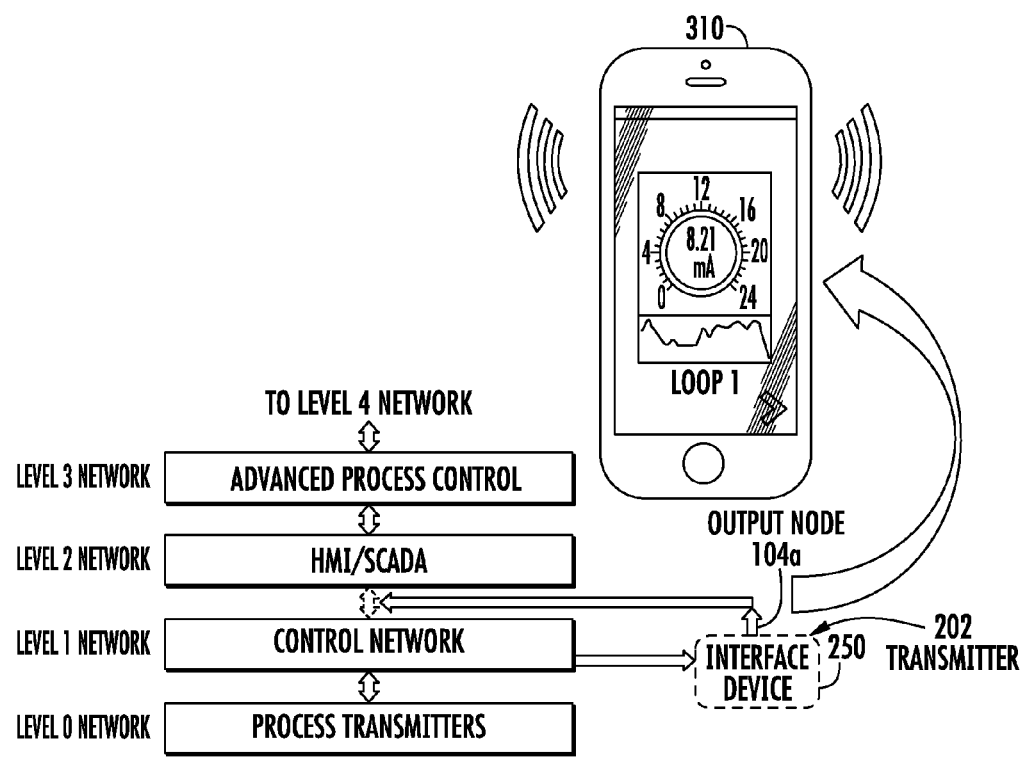
FIG. 3B shows a disclosed process interface device remote monitoring of a plurality of current loops positioned between Level 1 and Level 2 in a process facility.
Figure 6:
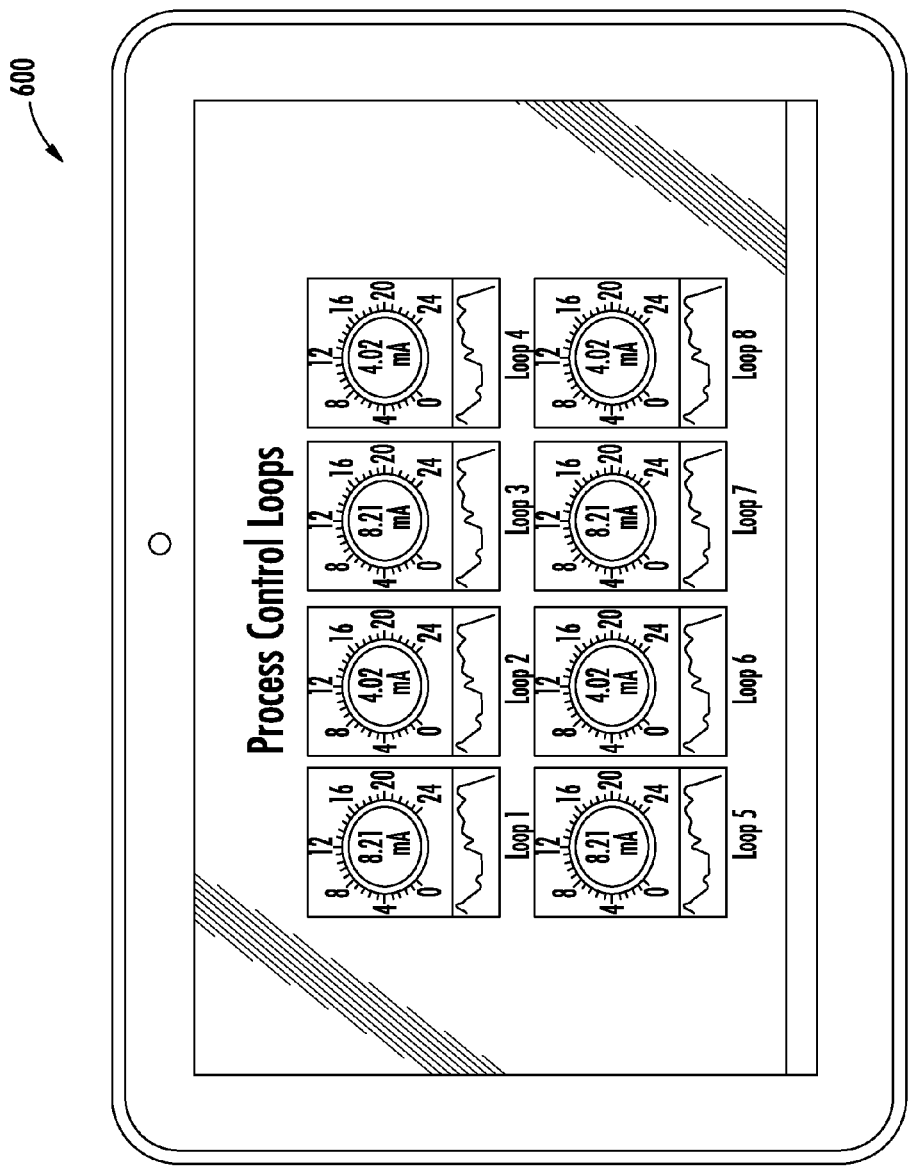
FIG. 6 shows a wireless device displaying 8 process control loops simultaneously for remote monitoring of a plurality of current loops wirelessly received from a disclosed process interface device, according to an example embodiment.

FIG. 3A shows a disclosed process interface device 250 for remote monitoring of a plurality of current loops positioned between Level 0 and Level 1 in a process facility. The process interface device 250 wirelessly transmits the sensed sensing signals to the portable wireless process monitoring device 310, with data from loop 1 shown as being 8.21 mA. The user of portable wireless process monitoring device 310 receives and displays the sensed sensing signals on the display of the wireless process monitoring device, and can perform a diagnostic from viewing the display, such as shown in FIG. 6 described below. FIG. 3B shows a disclosed process interface device 250 remote monitoring of a plurality of current loops positioned between Level 1 and Level 2 in a process facility.

Figure 4A:
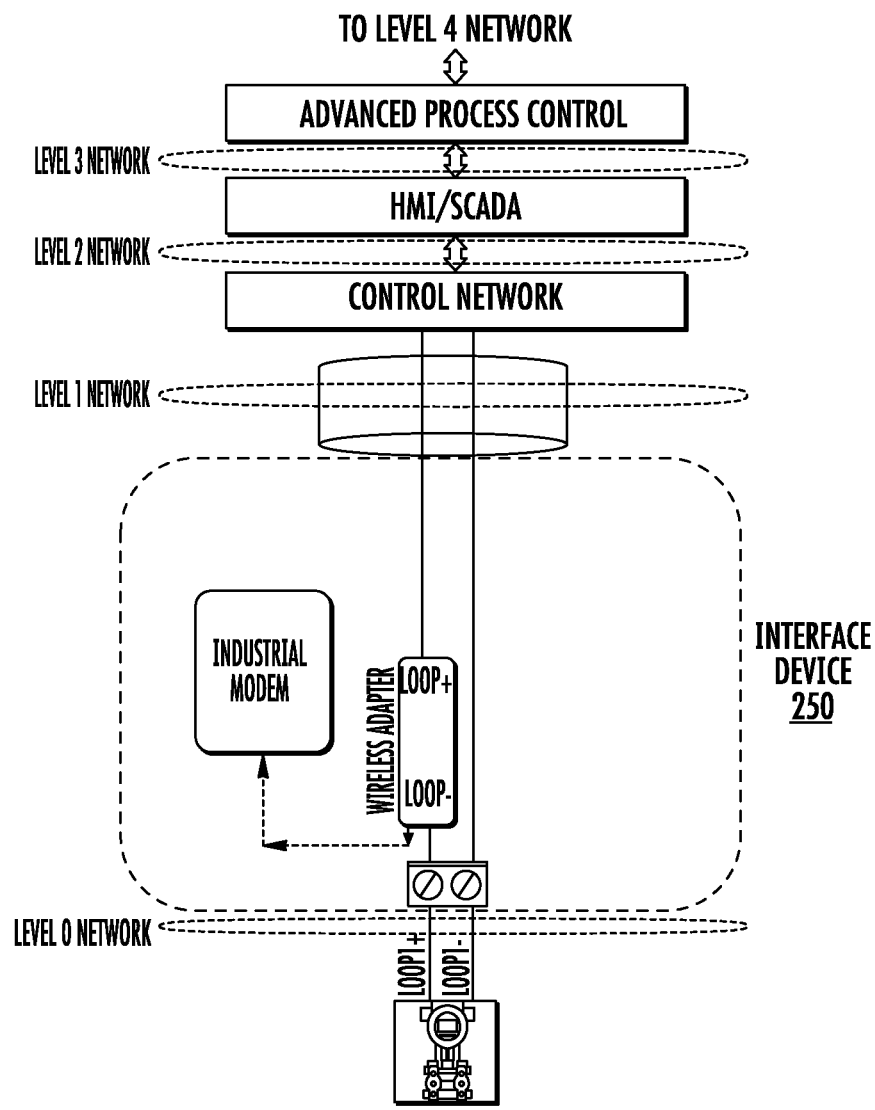
FIG. 4A shows a disclosed process interface device remote monitoring of a single current loop in a process facility positioned at level 0.
Figure 4B:
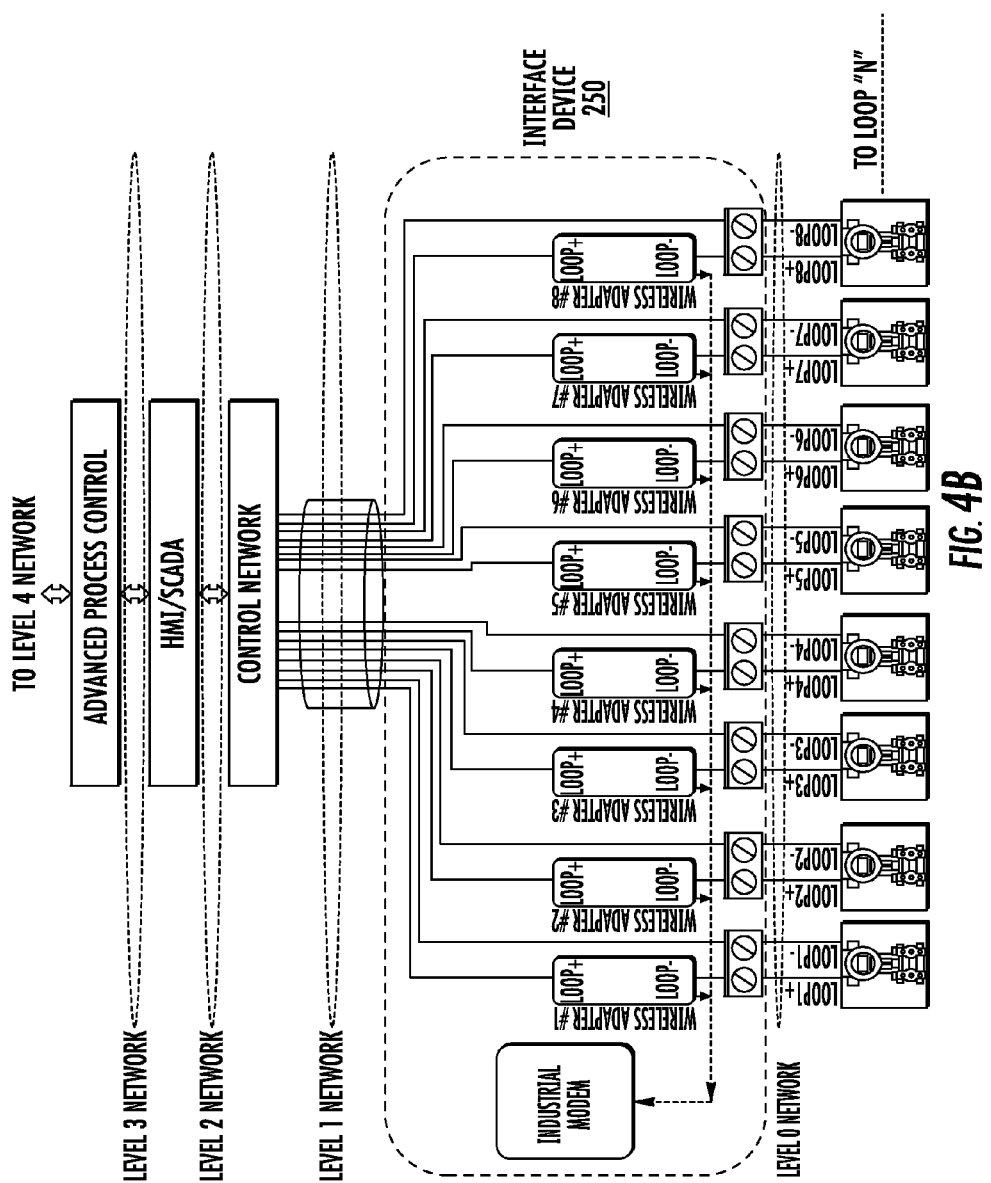
FIG. 4B shows a disclosed process interface device remote monitoring of a plurality of current loops in a process facility positioned at level 0 for providing remote monitoring of the plurality of current loops.

FIG. 4A shows a disclosed process interface device 250 for remote monitoring of a single current loop positioned at level 0. The process interface device 250 can also be at level 1. FIG. 4B shows a disclosed process interface device 250 remote monitoring of a plurality of current loops (shown as 8 loops) positioned at level 0 for providing remote monitoring of a plurality of current loops. As noted above, the process interface device 250 can also be other levels, such as at level 1.

Figure 5:
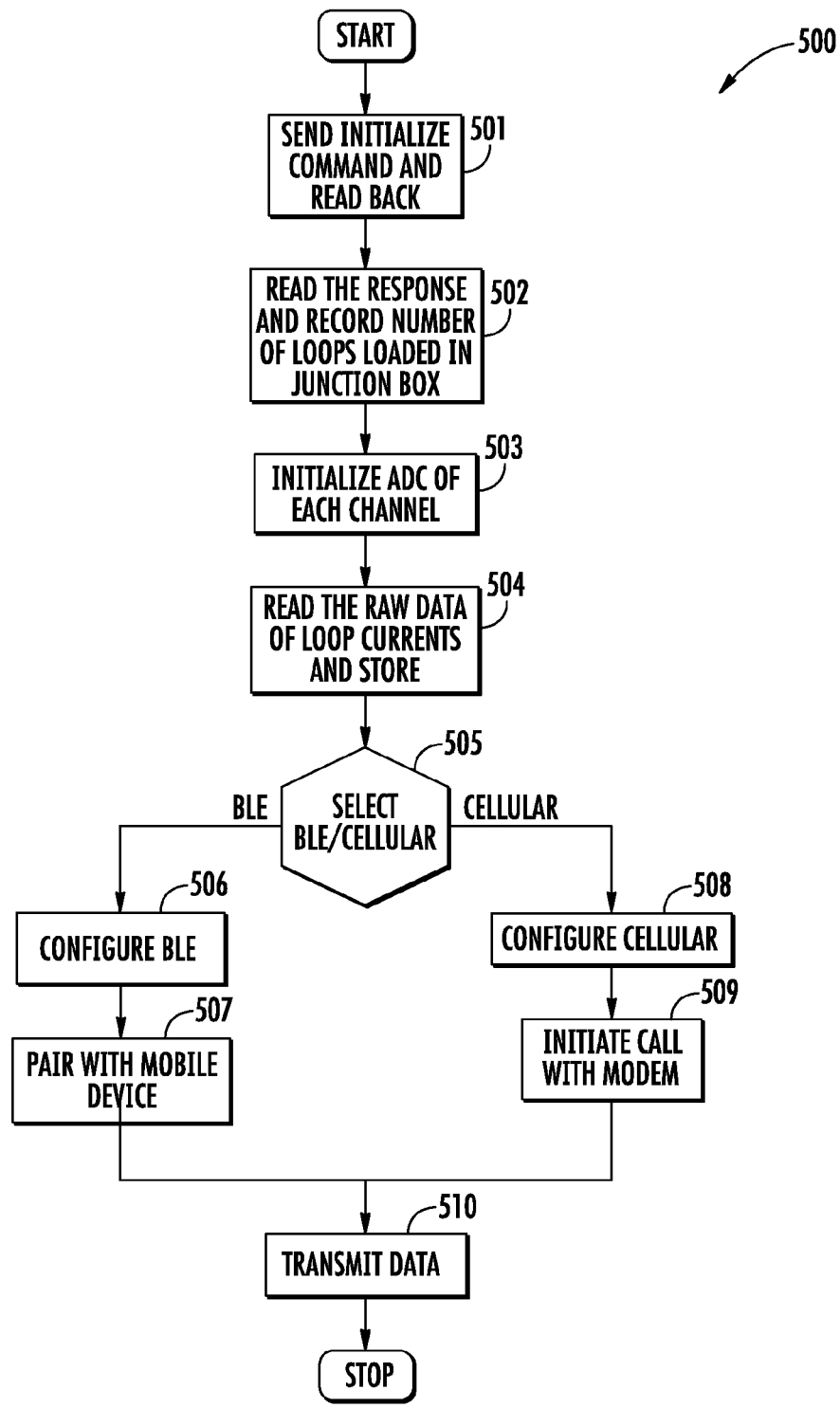
FIG. 5 is a flow chart that shows steps in a method of method of communicating sensor data for remote monitoring of a plurality of current loops, while still providing sensor data from the current loops to the control system, according to an example embodiment.

FIG. 5 is a flow chart showing steps in an example method 500 of communicating sensor data from a disclosed WSH device to a mobile device (e.g., portable wireless process monitoring device 310) for remote monitoring of a plurality of current loops while still providing sensor data from the current loops to the control system, according to an example embodiment. Step 501 comprises sending an initialize command and reading back data. Step 502 comprises reading the response and recording the number of loops loaded in the junction box. Step 503 comprises initializing the ADC for each channel. Step 504 comprises reading the raw data of loop currents and storing the same. Step 505 comprises selecting BLE or cellular.

If BLE is selected in step 505, step 506 comprising configuring BLE and step 507 pairing with the mobile device(s) occurs. The pairing mechanism is a process where the respective parties involved in the communication exchange their identity information to set up trust and obtain the encryption keys ready for future data exchanges. Depending on the user's requirement and the capability of the device, BLUETOOTH has several options for pairing. For example, in BLUETOOTH version 4.0 of the core specification, BLUETOOTH Smart uses the Secure Simple Pairing model in which devices choose one method from Just Works, Passkey Entry and Out Of Box (OOB) based on the input/output capability of the devices.

If cellular is selected in step 505 instead of BLE, step 508 comprising configuring cellular and step 509 initiating a call with a modem occurs. Step 510 comprises transmitting the wireless data to the mobile device.

Disclosed process interface devices 250 are capable of remotely providing predictive alerts to warn of potential failures of sensors 115 using lower and upper brownout detection. The processor 201 of the WSH device 200 can be programmed with predetermined lower and upper limits for sensor data from any of type of sensors (e.g., field devices) 115. Any deviation from outside these limits can be identified and then sent by the WSH device 200 as a wireless signal providing a predictive alert to user of a mobile device, such as the portable wireless process monitoring device 310 described above.

Disclosed process interface devices enables customers to remotely monitor and validate for process control. Such interface devices can be a retrofit solution adaptable to generally any existing or new industrial process control system. Disclosed process interface devices have advantages including ease of installation, low cost, reduced time for installation and commissioning, ease of maintenance and ease of expansion for the future.

EXAMPLES

Disclosed embodiments are further illustrated by the following specific Examples, which should not be construed as limiting the scope or content of this Disclosure in any way.

FIG. 6 shows a wireless device 600 displaying process data from 8 process control loops simultaneously for remote monitoring of a plurality of current loops wireless received from a disclosed process interface device 250, according to an example embodiment. A user (e.g., a field engineer) can thus simultaneously monitor information from multiple loop values via a terminal handheld device to enable diagnosis and troubleshooting without breaking the current loops.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of communicating sensor data, comprising:
providing a process facility running a physical process, said process facility including a level 0 having a plurality of processing equipment and a plurality of field devices, level 1 including process controllers, level 2 including supervisory controllers, a multi-loop current junction box (junction box) having an analog front end (AFE) including a signal path having an input node, an internal current sensor device, and an output node for each loop (current loop), level 3 including a control room, and level 4 including a business network, and at least one wireless single hop device (WSH device) including a processor and a wireless transmitter installed in said level 0, said level 1 or said level 2;
receiving analog current sensing signals (sensing signals) originating from said plurality of field devices at respective ones of said input nodes;
wherein said output nodes are coupled to said supervisory controllers, providing a processed form of said sensing signals to said supervisory controllers, and
wherein an input of said WSH device is coupled to receive respective outputs generated from sensing of said sensing signals (sensed sensing signals) by said internal current sensor device, said WSH device wirelessly multiplex transmitting said sensed sensing signals to at least one of said business network and a portable wireless process monitoring device of a user within said process facility.

2. The method of claim 1, wherein said internal current sensor device comprises a sense resistor and said respective outputs are across said sense resistors, and said signal path includes a power converter that provides said output nodes, further comprising digitally converting said respective outputs to provide a converted output, and providing said converted output over a communications bus to said input of said WSH device.

3. The method of claim 2, wherein said communications bus comprises a Serial Peripheral Interface (SPI) bus.

4. The method of claim 1, wherein said wirelessly multiplex transmitting comprises using a BLUETOOTH network or a cellular network.

5. The method of claim 1, wherein said user using said wireless process monitoring device receiving and displaying said sensing signals on a display of said wireless process monitoring device, further comprising said user performing a diagnostic from viewing said display.

6. The method of claim 1, wherein said WSH device is programmed with predetermined lower and upper limits for sensor data originating from said plurality of field devices, further comprising said processor detecting a deviation from said predetermined lower and upper limits, and said WSH device sending a wireless signal providing a predictive alert to said user of said portable wireless process monitoring device.

7. A process interface device for a process facility running a physical process, comprising:

a multi-loop current junction box (junction box) including an analog front end (AFE) including a signal path having an input node and an output node and an internal current sensor device for each loop (current loop), respective ones of said input nodes for receiving analog current sensing signals (sensing signals) originating from each of a plurality of field devices within said process facility, and an analog to digital converter (ADC) having inputs coupled across an output of said internal current sensor device;

a wireless single hop device (WSH device) including a processor and a wireless transmitter, wherein an input of said WSH device is coupled by a communications bus to receive respective outputs generated by said ADC comprising digitized versions of sensed ones of said sensing signals (sensed sensing signals), said WSH device for wirelessly multiplex transmitting said sensed sensing signals for remote monitoring of a plurality of said current loops.

8. The process interface device of claim 7, wherein said internal current sensor device comprises a sense resistor and said respective outputs are across said sense resistors, and said signal path includes a power converter that provides said output nodes.

9. The process interface device of claim 7, wherein said communications bus comprises a Serial Peripheral Interface (SPI) bus.

10. The process interface device of claim 7, wherein said wirelessly multiplex transmitting comprises BLUETOOTH or cellular transmitting.

11. The process interface device of claim 7, wherein said WSH device is within said junction box.

12. The process interface device of claim 7, further comprising a galvanic interface between an output of said ADC and said input of said WSH device.

* * * * *